US008484341B2

(12) United States Patent
Moran et al.

(10) Patent No.: US 8,484,341 B2
(45) Date of Patent: Jul. 9, 2013

(54) ORGANIZING INDIVIDUAL JAVA CLIENT REQUEST FLOWS INTO A SINGLE SERVER TRANSACTION

(75) Inventors: Timothy Andrew Moran, Winchester (GB); Shahrokh Nezamzadeh, Los Angeles, CA (US); Sylvia Virginia Ruksenas, San Luis Obispo, CA (US); Christopher Robert Walker, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 12/827,991

(22) Filed: Jun. 30, 2010

(65) Prior Publication Data

US 2012/0005330 A1 Jan. 5, 2012

(51) Int. Cl.
*G06F 15/173* (2006.01)
(52) U.S. Cl.
USPC ............................ 709/224; 709/223; 718/101
(58) Field of Classification Search
USPC .................................. 709/223–224; 718/101
See application file for complete search history.

(56) References Cited

U.S. PATENT DOCUMENTS

| 6,718,486 | B1 | 4/2004 | Roselli et al. ................... 714/41 |
| 6,721,907 | B2 | 4/2004 | Earl ................................. 714/57 |
| 7,430,740 | B1 * | 9/2008 | Molloy et al. ................ 718/101 |
| 7,487,407 | B2 | 2/2009 | Gehman et al. ................. 714/51 |
| 2002/0198814 | A1 * | 12/2002 | Bansal et al. .................... 705/37 |
| 2004/0128587 | A1 | 7/2004 | Kenchammana-Hosekote et al. ............................. 714/43 |
| 2007/0233753 | A1 * | 10/2007 | Taniguchi et al. ............ 707/202 |
| 2008/0263548 | A1 | 10/2008 | Chagoly et al. .............. 718/100 |
| 2009/0150908 | A1 * | 6/2009 | Shankaranarayanan et al. ............................. 719/320 |
| 2010/0268797 | A1 * | 10/2010 | Pyrik et al. ................... 709/220 |
| 2011/0088045 | A1 * | 4/2011 | Clementi et al. ............. 719/317 |
| 2011/0246558 | A1 * | 10/2011 | Shenfield ..................... 709/203 |

FOREIGN PATENT DOCUMENTS

JP 2007011896 A * 1/2007

OTHER PUBLICATIONS

"Server Selection for NFS V4," ip.com, IPCOM000155797D, Jul. 20, 2007.

* cited by examiner

*Primary Examiner* — Oanh Duong
(74) *Attorney, Agent, or Firm* — VanLeeuwen & VanLeeuwen; Jeffrey S. LaBaw

(57) ABSTRACT

An information handling device detects that multiple flows each include a common transaction-specific identifier. The transaction-specific identifier corresponds to a transaction and is generated in response to receiving a request over a computer network. The information handling device, in turn, logs data pertaining to each of the detected plurality of flows in a storage area. When the information handling device identifies a completion of the transaction, the information handling device calculates a total cost of the transaction using the logged data pertaining to each of the plurality of flows.

14 Claims, 7 Drawing Sheets

| Transaction Report 180 ||
|---|---|
| CLIENT TRANSACTIONS | SERVER TRANSACTIONS |
| TRANSACTION A:<br>- XaStart Flow<br>- XaEci Flow<br>- XaPrepare Flow<br>- XaRollback Flow | TRANSACTION A |
| TRANSACTION B:<br>- EciStatus Flow<br>- EciSynconreturn Flow | TRANSACTION B |
| TRANSACTION C:<br>- ExtendedModeEci Flow<br>- ExtendedModeEci Flow<br>- ExtendedModeCommit Flow | TRANSACTION C |

ORGANIZING INDIVIDUAL JAVA CLIENT REQUEST FLOWS INTO A SINGLE SERVER TRANSACTION

TECHNICAL FIELD

The present disclosure relates to correlating flows associated with a client request and storing the correlated flows as a transaction.

BACKGROUND

Businesses, such as financial institutions, may use transaction computer systems for managing business functions. These transaction computer systems may include a transaction gateway and a transaction server for processing client requests. For example, a Customer Information Control System (CICS) is designed for rapid, high-volume online processing. A CICS receives and processes requests from "clients," such as bank-teller applications, ATM systems, industrial production control systems, and insurance applications. The transaction computer systems may generate "overhead" flows in order to process client requests, such as communicating with a recovery manager in the event that a client's request is denied.

SUMMARY

An information handling device detects that multiple flows each include a common transaction-specific identifier. The transaction-specific identifier corresponds to a transaction and is generated in response to receiving a request over a computer network. The information handling device, in turn, logs data pertaining to each of the detected plurality of flows in a storage area. When the information handling device identifies a completion of the transaction, the information handling device calculates a total cost of the transaction using the logged data pertaining to each of the plurality of flows.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein:

FIG. 3 is a diagram showing an example of a transaction report;

DETAILED DESCRIPTION

Figure 1:
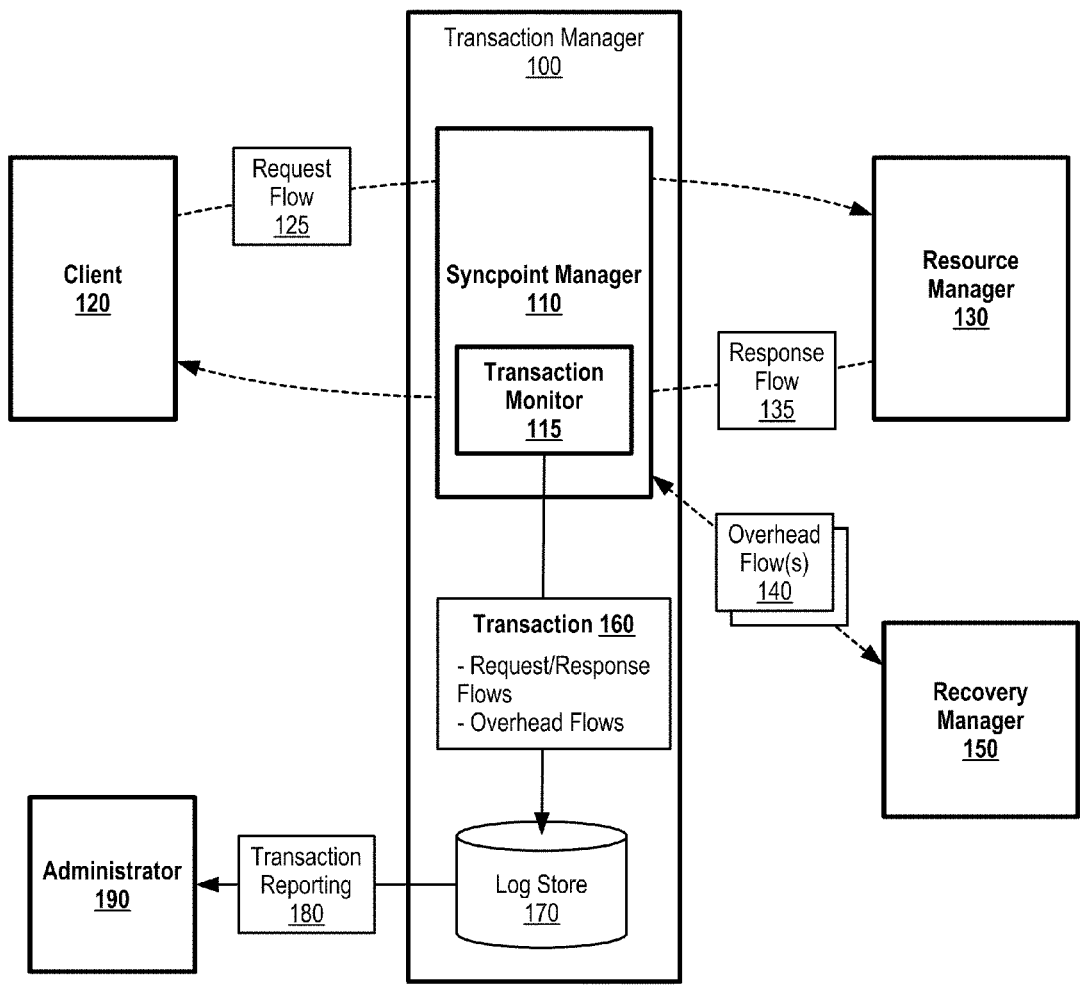
FIG. 1 is a diagram showing a transaction monitor detecting flows with a common transaction-specific identifier and logging data pertaining to the detected flows as transactions.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language (or similar programming languages), or machine language such as basic Assembler language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is a diagram showing a transaction monitor detecting flows with a common transaction-specific identifier and logging data pertaining to the detected flows as transactions.

FIG. 1 includes transaction manager 100, which includes syncpoint manager 110 and transaction monitor 115. In one embodiment, transaction manager 100 may be a WebSphere Application Server and, in this embodiment, syncpoint manager 110 may be a Customer Information Control System (CICS) Transaction Gateway.

FIG. 1 also includes resource manager 130 that, in one embodiment, may be a CICS Transaction Server that manages resources, such as bank account information. For example, client 120 may be an automated teller machine (ATM) that receives a request from a user to withdraw money from the user's bank account. In this example, a banking establishment may manage transaction manager 100 and resource manager 130 for processing client 120's request. In one embodiment, transaction manager 100 and resource manager 130 may reside on a single enterprise server under the aegis of a z/OS operating system.

Client 120 sends request flow 125 to resource manager 130 through transaction manager 100. In turn, syncpoint manager 110 invokes a thread and generates a unique correlation identifier that is specific to a "transaction" invoked by receiving request flow 125. For example, three different users may utilize client 120 for withdrawing money (transaction) and, in this example, syncpoint manager 110 generates a different unique correlation identifier for each of the three different client requests. Syncpoint manager 110 may use a variety of mechanisms to generate the transaction-specific identifier, such as a random number generator or a time stamp (see FIG. 5 and corresponding text for further details).

In addition, while processing request flow 125, syncpoint manager 110 generates overhead flows that are sent to recovery manager 150. Syncpoint manager 110 includes the same transaction-specific identifier in overhead flows 140 that is assigned to request flow 125. Thus, request flow 125 and overhead flows 140 include a common transaction-specific identifier. For example, when transaction manager 100 receives request flow 125, syncpoint manager 110 may invoke an "XaStart" overhead flow that indicates the start of an "XA" transaction, in which case both the XaStart overhead flow and the XA transaction include the same transaction-specific identifier. As those skilled in the art will appreciate, "XA" is part of a two-phase commit (2PC) protocol that ensures data integrity by coordinating single transactions that access multiple relational databases.

In one embodiment, overhead flows 140 may be executed by transaction manager 100 (e.g. WebSphere Application Server), which enlist transaction manager 100 as a participating resource manager that accesses or updates shared resources. In this embodiment, an overhead flow may register an "exit" with a Resource Recovery Management Services (RRMS) to commit actions, rollback actions, and/or respond to prepare requests.

Transaction manager 100 sends request flow 125 to resource manager 130, which processes request flow 125 and sends response flow 135 back to transaction manager 100 (e.g., authorization to withdraw money). When transaction manager 100 receives response flow 135, syncpoint manager 110 may generate additional overhead flows. For example, once authorization to withdraw money is approved, transaction manager 100 may issue an "XaPrepare," which is an overhead flow request to the RRMS to ensure that all enlisted resource participants are ready to commit in a coordinated fashion. A positive response from the RRMS enables transaction manager 100 to issue another overhead flow ("XaCommit") in a final step before money is dispensed. On the other hand, a negative response from the RRMS forces transaction manager 100 to issue an "XaRollback", which is an overhead flow request to put the shared resource (bank account) back to its prior state before the transaction started.

Transaction monitor 115 intercepts flows sent to/from syncpoint manager and correlates the flows based upon their transaction-specific identifier. As discussed herein, the term "correlate" refers to associating flows to each other, or grouping flows together into a transaction. For example, flows that include a transaction-specific identifier of "1234" are all grouped together and stored as a single transaction. FIG. 1 shows that transaction monitor 115 correlates request flow 125 and response flow 135 (e.g., resource bound flows), as well as overhead flows 140 (e.g., non-resource bound flows), and stores the correlated flows as transaction 160 in log store 170. (see FIGS. 2-5 and corresponding text for further details). Log store 170 may be stored on a volatile or non-volatile storage area, such as computer memory or a computer hard drive.

In turn, in one embodiment, administrator 190 may wish to view transaction activity for purposes such as auditing, capacity planning, monitoring, problem determination, client charge backs, etc. In this embodiment, administrator 190 invokes transaction reporting 180, which may include receiving a report that includes resource consumption information about transaction 160 along with other logged transactions. For example, a service provider (owner of transaction manager 100 and resource manager 130) may charge clients, or service requesters, based on computing time spent servicing transactions. In this example, administrator 190 may analyze transaction report 180 and assess transaction charges, which include resource utilization charges for corresponding overhead flows (see FIG. 3 and corresponding text for further details).

Figure 2:
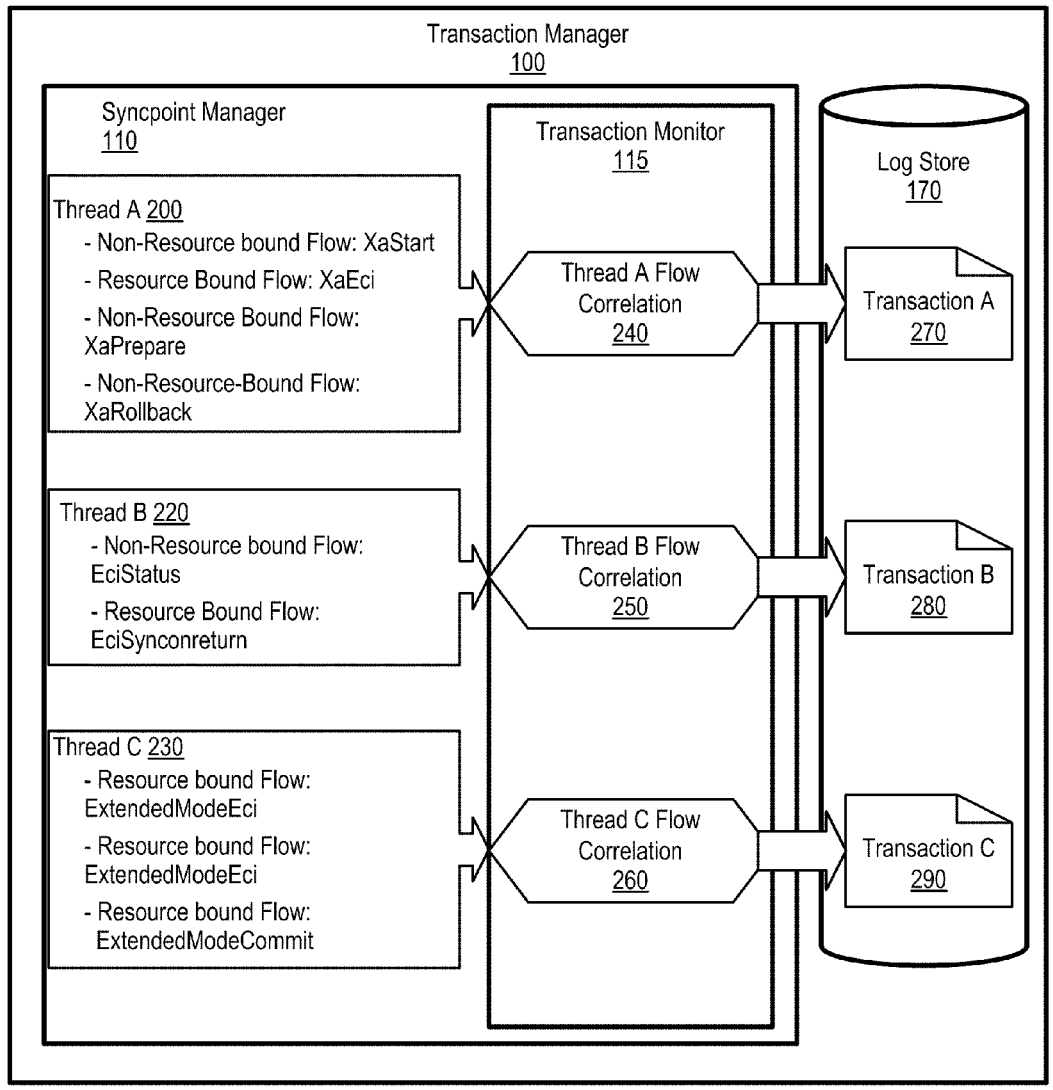
FIG. 2 is a diagram showing a transaction monitor correlating request flows, overhead flows, and response flows into transactions.

FIG. 2 is a diagram showing a transaction monitor correlating request flows, overhead flows, and response flows into transactions. FIG. 2 shows an example when transaction manager 100 processes three individual threads, such as from three different clients (thread A 200, thread B 220, and thread C 230). When transaction manager 100 received the request flows corresponding to the three threads, syncpoint manager 110 assigned transaction-specific identifiers to the different request flows (e.g., 1, 2, 3). In turn, transaction monitor 115 correlates and stores flows based upon their corresponding transaction-specific identifier.

Thread A 200 includes three overhead (non-resource bound) flows, which are "XaStart," "XaPrepare," and "XaRollback," and a request (resource bound) flow "XaEci." Transaction monitor 115 correlates these flows (thread A flow correlation 240) based upon their transaction-specific identifier and stores them in log store 150 as transaction A 270.

Thread B 220 includes an overhead (non-resource bound) flow "EciStatus" and a request (resource bound) flow "Eci-Synconreturn." Transaction monitor 115 correlates these flows (thread B flow correlation 250) based upon their transaction-specific identifier and stores them in log store 150 as transaction B 280.

And, thread C 230 includes three resource bound flows, two of which are request "ExtendedModeEci," and one of which is "ExtendedModeCommit". The ExtendedModeEci flows are to invoke multiple inquires prior to an update which is carried by an ExtendedModeCommit flow. Transaction monitor 115 correlates these flows (thread C flow correlation 260) based upon their transaction-specific identifier and stores them in log store 150 as transaction C 290.

FIG. 3 is a diagram showing an example of a transaction report. Transaction report 180 includes a list of transactions that were originated from a client to be serviced by a destination server. Column 300 includes multiple client request flows as well as overhead flows. Column 320 includes single transactions that carried out corresponding client requests. As such, the total "cost" of a transaction is the sum of the cost of the flows shown in column 300 and the cost of the single server transactions shown in column 320. Administrator 190 may wish to view transaction report 180 for purposes such as auditing, capacity planning, monitoring, problem determination, client charge backs, etc.

Figure 4:
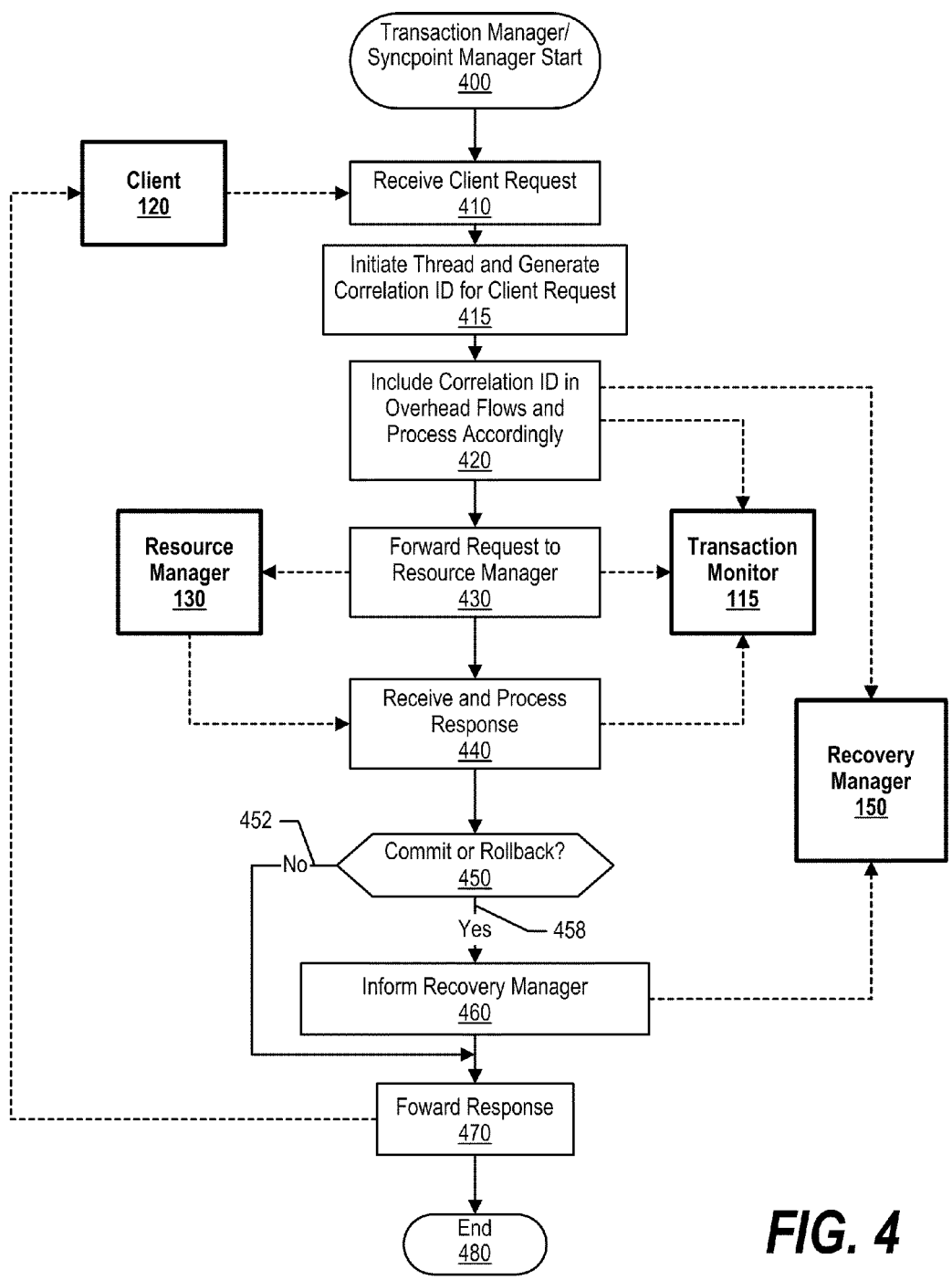
FIG. 4 is a flowchart showing steps taken in a syncpoint manager processing client requests and a transaction monitor correlating flows and storing correlated flows as transactions.

FIG. 4 is a flowchart showing steps taken in a transaction manager and syncpoint manager processing client requests. A syncpoint manager, such as syncpoint manager 110 shown in FIG. 1, may generate numerous overhead activity (overhead flows 140) associated with a client request (request flow 125), such as invoking an "XAStart" command to start an XA transaction. As such, a transaction monitor (e.g., transaction monitor 115 shown in FIG. 1) intercepts and correlates flows and stores them as transactions in order for an administrator to ascertain overall costs associated with the client request.

Processing commences at 400, whereupon the transaction manager receives a flow request from client 120 at step 410. The syncpoint manager initiates a thread to handle the flow request and generates/assigns a transaction-specific correlation ID to the flow request (step 415). For example, the syncpoint manager may utilize a random number generator to generate a hexadecimal number as a correlation ID. The syncpoint manager includes this transaction-specific correlation ID in associated overhead flows to process the request flow (discussed below).

At step 420, the syncpoint manager generates and processes overhead flows (e.g. sent to recovery manager 150) in order to process the request flow. The syncpoint manager includes the same transaction-specific identifier into the overhead flows r that was previously generated for the corresponding request flow. Transaction monitor 115 intercepts and logs data pertaining to the request flow and overhead flows during the above steps according to their transaction-specific identifier (see FIG. 5 and corresponding text for further details). Upon successful processing of the overhead flows, the syncpoint manager forwards the flow request to resource manager 130 for processing. Again, transaction monitor 115 intercepts the request and correlates the request flow according to its transaction-specific identifier.

Resource manager 130 processes the flow request and sends a response flow (includes the transaction-specific identifier) back to the transaction manager, which the syncpoint manager receives at step 440. Transaction monitor 115 intercepts and logs data pertaining to the response flow, as well as other overhead flows. For example, the syncpoint manager may inform recovery manager 150 to prepare for committing (commit flow) or rolling back rollback flow) a transaction (e.g, a non-resource bound XaRollback).

A determination is made as to whether to commit/rollback the transaction or whether the syncpoint manager should wait on more requests from the client. (decision 450). If the syncpoint manager should not request a commit/rollback action, decision 450 branches to "No" branch 452 whereupon the syncpoint manager forwards a corresponding response to client 120 at step 470. On the other hand, if the syncpoint manager should request a commit or rollback action, decision 450 branches to "Yes" branch 458 whereupon the syncpoint manager informs recovery manager 200 to commit the transaction or rollback the transaction accordingly. At step 470, the syncpoint manager forwards the response to client 120 and syncpoint manager processing ends at 490.

Figure 5:
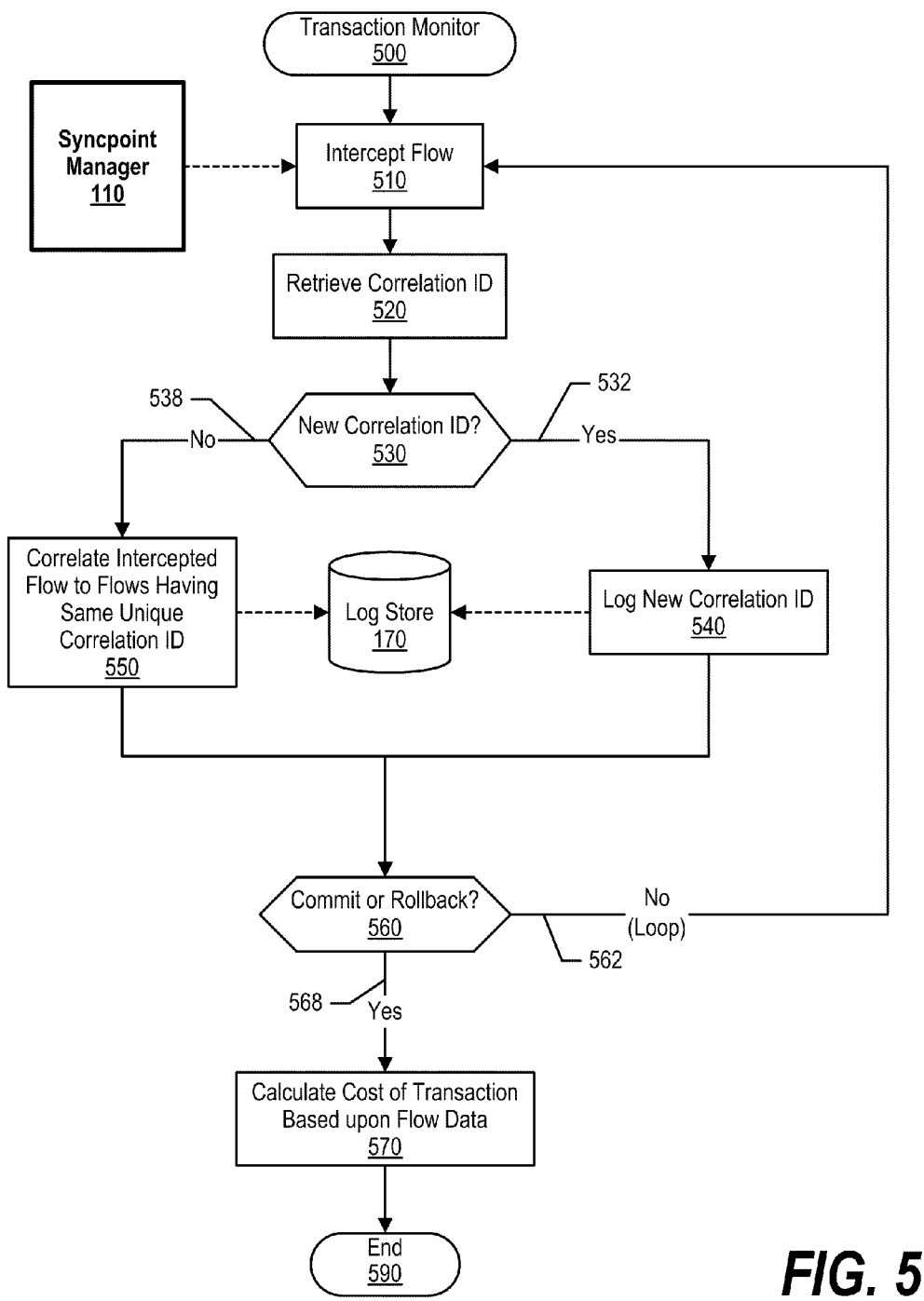
FIG. 5 is a flowchart showing steps taken in a transaction monitor correlating flows based upon transaction-specific identifiers.

FIG. 5 is a flowchart showing steps taken in a transaction monitor correlating flows based upon transaction-specific identifiers. A transaction manager's syncpoint manager processes multiple requests with multiple threads. The syncpoint manager generates and assigns a transaction-specific identifier to each thread and includes the transaction-specific identifier in corresponding overhead flows, which are generated in order to process client requests.

Transaction monitoring processing commences at 500, whereupon the transaction monitor intercepts flows being processed by syncpoint manager 110, such as a request flow, an overhead flow, or a response flow (step 510). At step 520, the transaction monitor retrieves a transaction-specific identifier from the detected flow, such as from a correlation ID field.

A determination is made as to whether the retrieved transaction-specific identifier is new by checking log store 150 to see if the same transaction-specific identifier has been logged (decision 530). If the transaction-specific identifier is new, decision 530 branches to "Yes" branch 532 whereupon the transaction monitor logs a new transaction-specific identifier in log store 150 at step 540 as well as data pertaining to the intercepted flow. On the other hand, if the transaction-specific identifier has already been logged, decision 530 branches to "No" branch 538, whereupon processing logs data pertaining to the intercepted flow with other data pertaining to flows having the same transaction-specific identifier (step 550).

A determination is made as to whether the intercepted flow is a commit or rollback flow (decision 560). If the detected flow is not a commit or rollback then neither client has requested to end the transaction nor recovery manager detected any problems to end that transaction, decision 560 branches to "No" branch 562, which loops back to continue intercepting flows. On the other hand, if the intercepted flow is a commit or rollback, decision 560 branches to "Yes" branch 568 whereupon, in one embodiment, the transaction monitor calculates a cost of the transaction based upon the logged flow data (step 570). In another embodiment, the transaction monitor provides the logged flow data in a report and sends the report to an administrator. Transaction monitor processing ends at 590.

Figure 6:
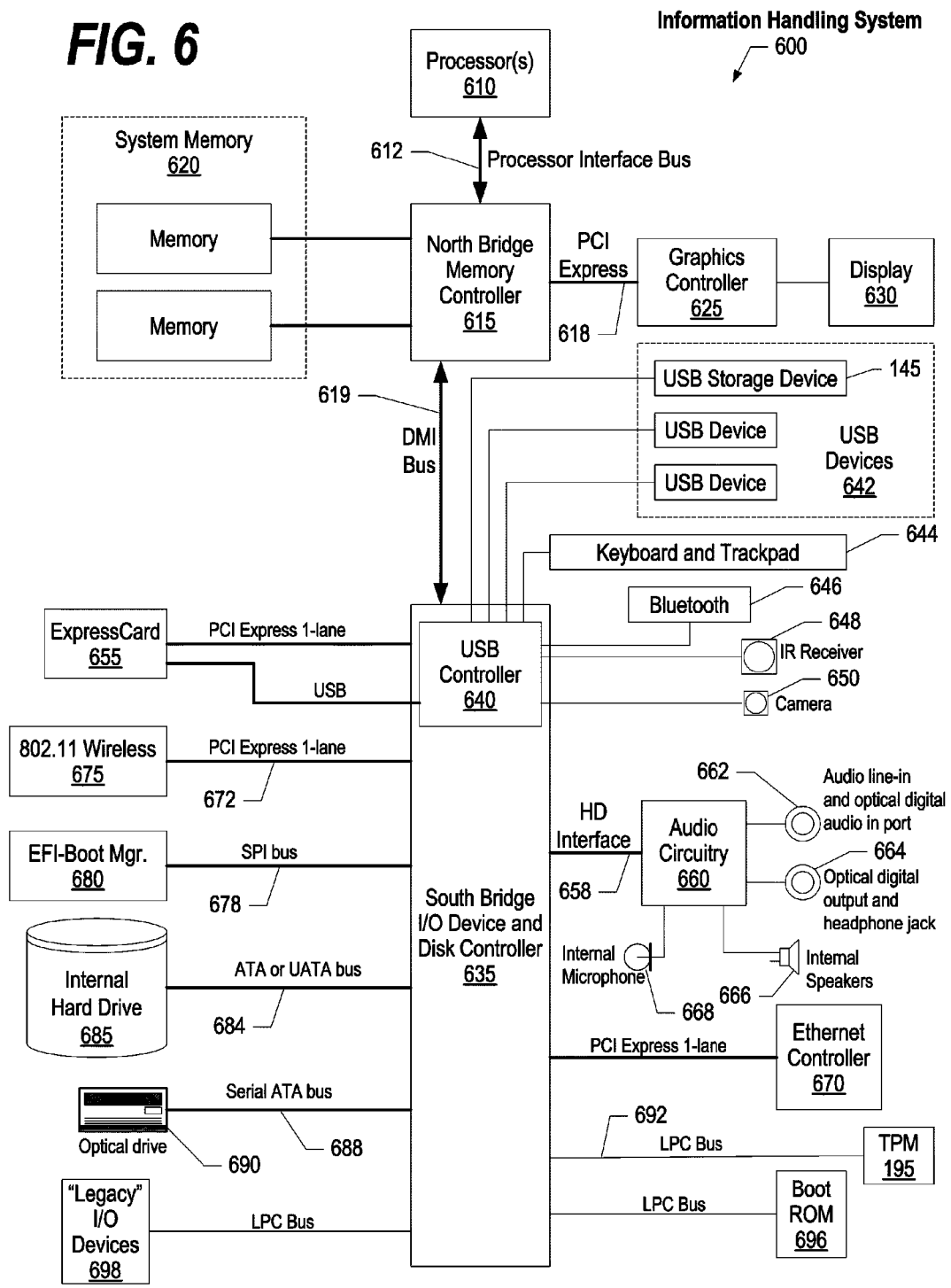
FIG. 6 is a block diagram example of a data processing system in which the methods described herein can be implemented.

FIG. 6 illustrates information handling system 600, which is a simplified example of a computer system capable of performing the computing operations described herein. Information handling system 600 includes one or more processors 610 coupled to processor interface bus 612. Processor interface bus 612 connects processors 610 to Northbridge 615, which is also known as the Memory Controller Hub (MCH). Northbridge 615 connects to system memory 620 and provides a means for processor(s) 610 to access the system memory. Graphics controller 625 also connects to Northbridge 615. In one embodiment, PCI Express bus 618 connects Northbridge 615 to graphics controller 625. Graphics controller 625 connects to display device 630, such as a computer monitor.

Northbridge 615 and Southbridge 635 connect to each other using bus 619. In one embodiment, the bus is a Direct Media Interface (DMI) bus that transfers data at high speeds in each direction between Northbridge 615 and Southbridge 635. In another embodiment, a Peripheral Component Interconnect (PCI) bus connects the Northbridge and the Southbridge. Southbridge 635, also known as the I/O Controller Hub (ICH) is a chip that generally implements capabilities that operate at slower speeds than the capabilities provided by the Northbridge. Southbridge 635 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 696 and "legacy" I/O devices (using a "super I/O" chip). The "legacy" I/O devices (698) can include, for example, serial and parallel ports, keyboard, mouse, and/or a floppy disk controller. The LPC bus also connects Southbridge 635 to Trusted Platform Module (TPM) 695. Other components often included in Southbridge 635 include a Direct Memory Access (DMA) controller, a Programmable Interrupt Controller (PIC), and a storage device controller, which connects Southbridge 635 to nonvolatile storage device 685, such as a hard disk drive, using bus 684.

ExpressCard 655 is a slot that connects hot-pluggable devices to the information handling system. ExpressCard 655 supports both PCI Express and USB connectivity as it connects to Southbridge 635 using both the Universal Serial Bus (USB) the PCI Express bus. Southbridge 635 includes USB Controller 640 that provides USB connectivity to devices that connect to the USB. These devices include webcam (camera) 650, infrared (IR) receiver 648, keyboard and trackpad 644, and Bluetooth device 646, which provides for wireless personal area networks (PANs). USB Controller 640 also provides USB connectivity to other miscellaneous USB connected devices 642, such as a mouse, removable nonvolatile storage device 645, modems, network cards, ISDN connectors, fax, printers, USB hubs, and many other types of USB connected devices. While removable nonvolatile storage device 645 is shown as a USB-connected device, removable nonvolatile storage device 645 could be connected using a different interface, such as a Firewire interface, etcetera.

Wireless Local Area Network (LAN) device 675 connects to Southbridge 635 via the PCI or PCI Express bus 672. LAN device 675 typically implements one of the IEEE 802.11 standards of over-the-air modulation techniques that all use the same protocol to wirelessly communicate between information handling system 600 and another computer system or device. Optical storage device 690 connects to Southbridge 635 using Serial ATA (SATA) bus 688. Serial ATA adapters and devices communicate over a high-speed serial link. The Serial ATA bus also connects Southbridge 635 to other forms of storage devices, such as hard disk drives. Audio circuitry 660, such as a sound card, connects to Southbridge 635 via bus 658. Audio circuitry 660 also provides functionality such as audio line-in and optical digital audio in port 662, optical digital output and headphone jack 664, internal speakers 666, and internal microphone 668. Ethernet controller 670 connects to Southbridge 635 using a bus, such as the PCI or PCI Express bus. Ethernet controller 670 connects information handling system 600 to a computer network, such as a Local Area Network (LAN), the Internet, and other public and private computer networks.

While FIG. 6 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 695) shown in FIG. 6 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 7.

Figure 7:
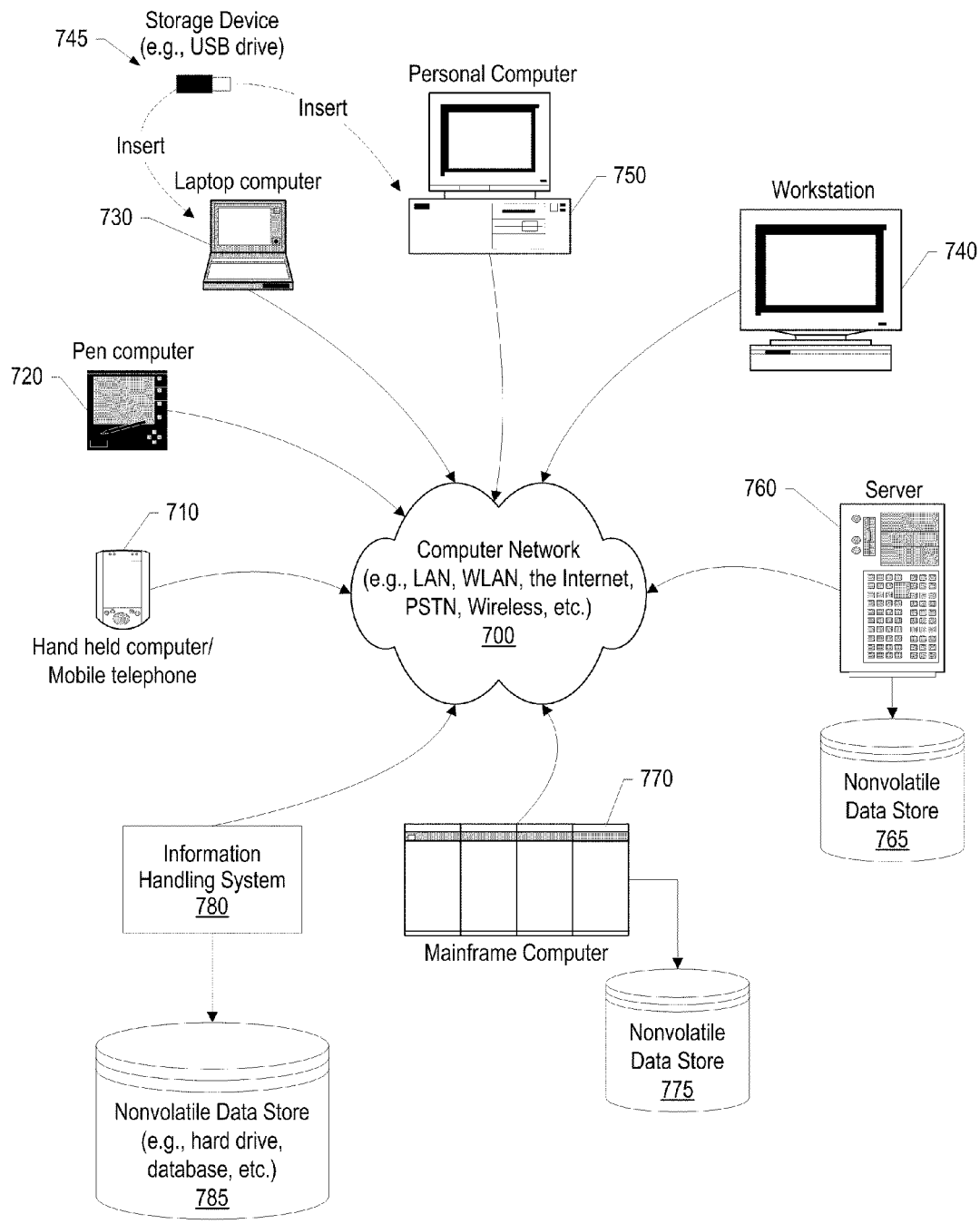
FIG. 7 provides an extension example of the information handling system environment shown in FIG. 6 to illustrate that the methods described herein can be performed on a wide variety of information handling systems which operate in a networked environment.

FIG. 7 provides an extension example of the information handling system environment shown in FIG. 6 to illustrate that the methods described herein can be performed on a wide variety of information handling systems that operate in a networked environment. Types of information handling systems range from small handheld devices, such as handheld computer/mobile telephone 710 to large mainframe systems, such as mainframe computer 770. Examples of handheld computer 710 include personal digital assistants (PDAs), personal entertainment devices, such as MP3 players, portable televisions, and compact disc players. Other examples of information handling systems include pen, or tablet, computer 720, laptop, or notebook, computer 730, workstation 740, personal computer system 750, and server 760. Other types of information handling systems that are not individually shown in FIG. 7 are represented by information handling system 780. As shown, the various information handling systems can be networked together using computer network 700. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 7 depicts separate nonvolatile data stores (server 760 utilizes nonvolatile data store 765, mainframe computer 770 utilizes nonvolatile data store 775, and information handling system 780 utilizes nonvolatile data store 785). The nonvolatile data store can be a component that is external to the various information handling systems or can be internal to one of the information handling systems. In addition, removable nonvolatile storage device 745 can be shared among two or more information handling systems using various techniques, such as connecting the removable nonvolatile storage device 745 to a USB port or other connector of the information handling systems.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A computer program product stored in a computer readable storage device, comprising functional descriptive material that, when executed by an information handling system, causes the information handling system to perform actions that include:
    inserting, in response to receiving a client request, a transaction-specific identifier into a plurality of flows, wherein the plurality of flows includes a request flow corresponding to the request and one or more overhead flows that are sent between the information handling system and an external recovery manager;
    sending the request flow to a resource manager, wherein the resource manager is different than the external recovery manager;
    including a response flow received from the resource manager into the plurality of flows, the response flow including the transaction-specific identifier; and
    calculating a total cost of a transaction based upon data pertaining to each of the plurality of flows.

2. The computer program product of claim 1 wherein the data pertaining to the plurality of flows is logged in a storage area, and wherein the functional descriptive material that, when executed by the information handling system, causes the information handling system to further perform actions that include:
    intercepting the request flow;
    retrieving the transaction-specific identifier from the intercepted request flow;
    determining whether the transaction-specific identifier is logged in the storage area;
    in response to determining that the transaction-specific identifier fails to be logged in the storage area, storing the transaction-specific identifier in the storage area; and
    wherein the logging of the data results in correlating the data pertaining to the intercepted request flow to the transaction-specific identifier.

3. The computer program product of claim 2 wherein the functional descriptive material that, when executed by the information handling system, causes the information handling system to further perform actions that include:
    intercepting the overhead flow;
    retrieving the transaction-specific identifier from the intercepted overhead flow;
    determining that the transaction-specific identifier is logged in the storage area; and
    in response to determining that the transaction-specific identifier is logged in the storage area, the logging of the data results in correlating the data pertaining to the intercepted overhead flow to the transaction-specific identifier.

4. The computer program product of claim 1 wherein the information handling system is a customer information control system (CICS) transaction gateway, and wherein one or more of the plurality of flows is a CICS flow and one or more of the plurality of flows is a non-CICS flow.

5. The computer program product of claim 1 wherein the information handling system receives a subsequent request flow, and wherein the functional descriptive material that, when executed by the information handling system, causes the information handling system to further perform actions that include:
generating, at the transaction gateway, a subsequent transaction-specific identifier that is different than the transaction-specific identifier;
generating a subsequent overhead flow in response to receiving the subsequent request flow; and
inserting the subsequent transaction-specific identifier into the subsequent overhead flow.

6. The computer program product of claim 1 wherein the data pertaining to the plurality of flows is logged in a storage area, and wherein the functional descriptive material that, when executed by the information handling system, causes the information handling system to further perform actions that include:
determining that one of the plurality of flows is a rollback flow; and
performing a rollback action using the logged data pertaining to each of the plurality of flows in response to determining that one of the plurality of flows is a rollback flow.

7. The computer program product of claim 1 wherein one of the one or more overhead flows is generated and sent from the information handling system to the external recovery manager in response to receiving the response flow from the resource manager.

8. An information handling system comprising:
one or more processors;
a memory accessible by at least one of the processors;
a set of instructions stored in the memory and executed by at least one of the processors in order to perform actions of:
inserting, in response to receiving a client request, a transaction-specific identifier into a plurality of flows, wherein the plurality of flows includes a request flow corresponding to the request and one or more overhead flows that are sent between the information handling system and an external recovery manager;
sending the request flow to a resource manager, wherein the resource manager is different than the external recovery manager;
including a response flow received from the resource manager into the plurality of flows, the response flow including the transaction-specific identifier; and
calculating a total cost of a transaction based upon data pertaining to each of the plurality of flows.

9. The information handling system of claim 8 wherein the data pertaining to the plurality of flows is logged in a storage area, and wherein the set of instructions, when executed by one of the processors, further performs actions of:
intercepting the request flow;
retrieving the transaction-specific identifier from the intercepted request flow;
determining whether the transaction-specific identifier is logged in the storage area;
in response to determining that the transaction-specific identifier fails to be logged in the storage area, storing the transaction-specific identifier in the storage area; and
wherein the logging of the data results in correlating the data pertaining to the intercepted request flow to the transaction-specific identifier.

10. The information handling system of claim 9 wherein the set of instructions, when executed by one of the processors, further performs actions of:
intercepting the overhead flow;
retrieving the transaction-specific identifier from the intercepted overhead flow;
determining that the transaction-specific identifier is logged in the storage area; and
in response to determining that the transaction-specific identifier is logged in the storage area, the logging of the data results in correlating the data pertaining to the intercepted overhead flow to the transaction-specific identifier.

11. The information handling system of claim 8 wherein the information handling system is a customer information control system (CICS) transaction gateway, and wherein one or more of the plurality of flows is a CICS flow and one or more of the plurality of flows is a non-CICS flow.

12. The information handling system of claim 8 wherein the information handling system receives a subsequent request flow, and wherein
the set of instructions, when executed by one of the processors, further performs actions of:
generating, at the transaction gateway, a subsequent transaction-specific identifier that is different than the transaction-specific identifier;
generating a subsequent overhead flow in response to receiving the subsequent request flow; and
inserting the subsequent transaction-specific identifier into the subsequent overhead flow.

13. The information handling system of claim 8 wherein the data pertaining to the plurality of flows is logged in a storage area, and wherein the set of instructions, when executed by one of the processors, further performs actions of:
determining that one of the plurality of flows is a rollback flow; and
performing a rollback action using the logged data pertaining to each of the plurality of flows in response to determining that one of the plurality of flows is a rollback flow.

14. The information handling system of claim 8 wherein one of the one or more overhead flows is generated and sent from the information handling system to the external recovery manager in response to receiving the response flow from the resource manager.

* * * * *